United States Patent
Fink et al.

[15] 3,677,010
[45] July 18, 1972

[54] ROCKET MOTOR AND METHOD

[72] Inventors: Robert H. Fink; Eugene J. Palm, both of Huntsville, Ala.

[73] Assignee: The United States of America as represented by the Secretary of the Army

[22] Filed: March 11, 1964

[21] Appl. No.: 351,256

[52] U.S. Cl. ............................ 60/220, 60/207, 60/250, 60/219, 60/253, 102/103, 149/2, 149/19
[51] Int. Cl. .......................................... C06d 5/10, F02k 9/06
[58] Field of Search .......................................... 149/2, 17–19; 102/98, 103; 60/35.4, 207, 219, 220, 250, 251, 253

[56] References Cited

UNITED STATES PATENTS

| | | | |
|---|---|---|---|
| 3,120,737 | 2/1961 | Holloway | 60/250 |
| 3,068,641 | 4/1955 | Fox | 60/207 |
| 3,032,970 | 1/1957 | Fox | 60/253 |

*Primary Examiner*—Benjamin R. Padgett
*Attorney*—Harry M. Saragovitz, Edward J. Kelly and Herbert Berl

EXEMPLARY CLAIM

7. The method of operating a solid-fueled rocket motor to vary the total impulse achieved, said motor comprising, in combination, a substantially cylindrical outside wall which forms a chamber, said wall being tapered at the rearward end of said chamber to form a converging-diverging nozzle, said wall also closing the forward end of said chamber except for an opening to receive a tube whereby fluid can be introduced into said chamber; a solid rocket propellant grain rigidly disposed in said chamber, said grain comprising a plurality of concentric layers of propellant, the propellant layer nearest the center of the grain having disposed therein a perforation passing from end to end therethrough along the center axis of said grain, said layers consisting essentially of a cured intimate mixture of polymeric binder, fuel particles, and an oxidizer therefor, said layers being completely separated from each other by a liner, said liner consisting essentially of a cured polymeric material incapable of supporting its own combustion, said method comprising:

a. igniting and burning the innermost layer of propellant, thereby exposing the adjacent liner;

b. introducing into the forward end of said chamber through said opening an oxidizer fluid which is hypergolic with said liner whereby the liner ignites, burns, and in turn ignites the adjacent layer of propellant; and c. repeating steps (a) and (b) until as many propellant layers as desired have been consumed.

10 Claims, 3 Drawing Figures

PATENTED JUL 18 1972  3,677,010
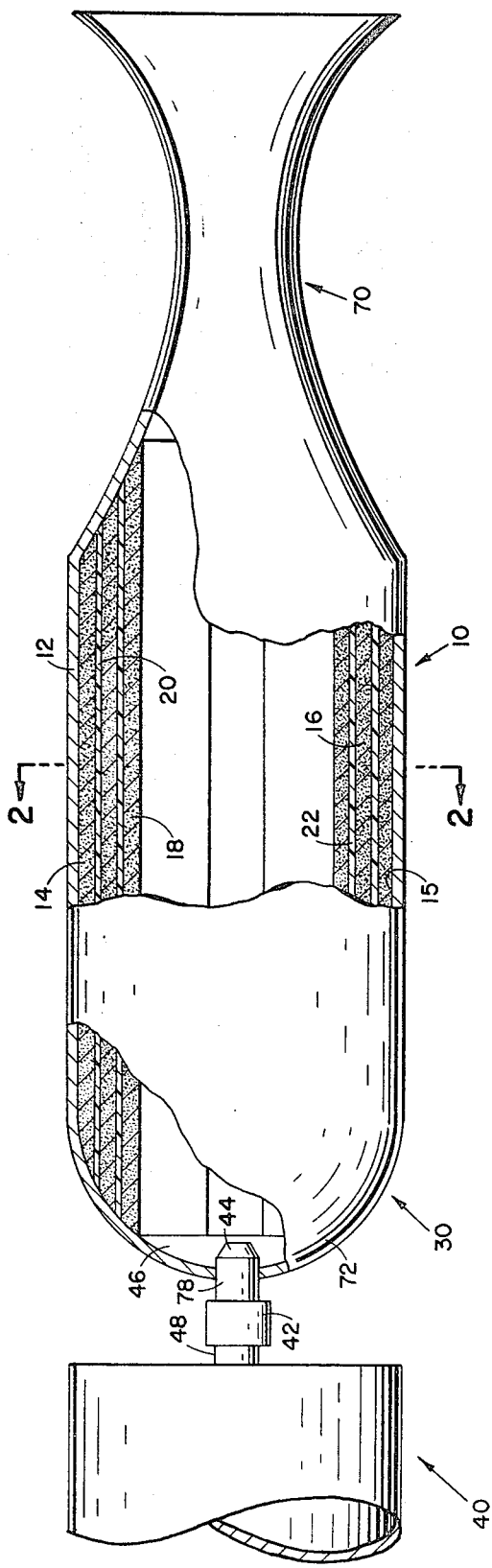
FIG. 1
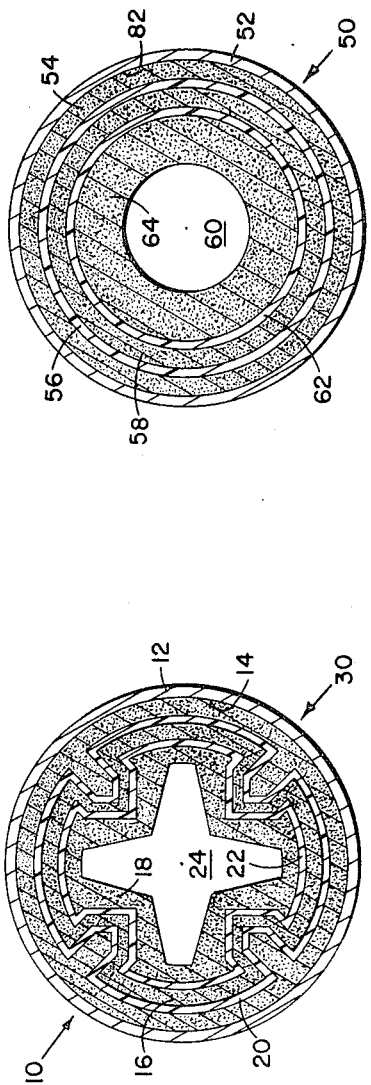
FIG. 3
FIG. 2
Robert H. Fink
Eugene J. Palm,
INVENTORS.
BY Harry M. Saragovitz
Edward J. Kelly
Herbert Berl
James H. Adams Jr.

ROCKET MOTOR AND METHOD

The invention described herein may be manufactured and used by or for the Government for governmental purposes without the payment of any royalty thereon.

This invention relates to solid-fueled rocket motors. Particularly the invention concerns a novel solid rocket propellant grain structure, a method for using these grains in the operation of a solid-fueled rocket engine in such a manner as to regulate the overall impulse of the engine, and to solid rocket motor themselves.

Solid-fueled rocket motors possess certain characteristics which render them preferable to liquid-fueled engines, especially for military application. Thus, solid-fueled rocket engines do not require complicated systems of valves, pumps, and tubing to move the propellant constituents from their storage tanks to the combustion chamber. Moreover, there is no requirement for the storage, transportation, and handling of great quantities of highly corrosive, toxic, and easily vaporized materials as with many liquid-fueled engines.

However, liquid-fueled engines have one very important and distinct advantage over the solid-fueled engines. In a solid propellant grain, the fuel particles and oxidizer are bound together as a single unit. Once the grain has been ignited, combustion continues until the entire grain is consumed. This makes it difficult to vary the total impulse of the rocket motor. Such devices as head-in reversal ports have not proven completely satisfactory in alleviating this problem. On the other hand, the flow of liquid propellant to the combustion chamber can be readily controlled by valves, variable pump speeds, and the like so that the overall total impulse of the engine can be varied. The flow of propellant can even be completely stopped and then restarted if desired. This characteristic of liquid-fueled engines permits propelling missiles varying distances. For example, a liquid-fueled artillery rocket designed to deliver a warhead up to 250 miles can also deliver the warhead to any reasonable point less than 250 miles simply by controlling the flow rate and total flow of liquid propellant to the combustion chamber. A solid-fueled engine designed to deliver a warhead a specific distance in free flight is limited in its ability to alter this range capability by means other than changing the angle of elevation of the rocket at launch time, which is far from being a completely satisfactory solution to the problem.

It is readily apparent that it would be very desirable to have a solid-fueled rocket motor that would permit varying to total impulse, thus combining the advantages of both the solid-fueled and liquid-fueled engines.

According to the present invention, the solid rocket propellant grains consist of a plurality of individual layers of propellant. The grains are cast in concentric layers with each layer of propellant being completely separated by a liner made of material which does not have any (or at least insufficient) oxidizer incorporated therein to sustain its own combustion. When the innermost layer of propellant is ignited it burns through completely. However, the liner material separating the propellant layers does not burn as there is no available oxidizer to support its combustion. Therefore, the remaining layers of propellant do not ignite and the rocket engine ceases to function. If, however, the intended range of the rocket requires additional impulse, an oxidizer fluid which is hypergolic with the liner is injected into the chamber and thereby ignites the liner which, after burning through, ignites the adjacent layer of propellant. This process is repeated until a sufficient number of propellant layers has been burned to provide the necessary impulse to propel the payload of the rocket the desired distance. The instant invention makes it possible to design solid-fueled rocket engines which can be used to propel a payload varying distances by regulating the amount of the solid propellant grain consumed. By combining the regulation of the amount of fuel burned with a variation in launch angle, the instant invention permits the use of only one type of solid-fueled rocket motor to provide a wide range of performance capabilities with regard to effective range and trajectory. Such an engine combines the simplicity and reliability of the solid-fueled engines with the variable range and trajectory capabilities of the liquid-fueled engines. Moreover, an engine of the type contemplated by the invention offers tremendous economic advantages since the many types of solid-fueled engines now required to give complete range capabilities over a wide latitude of operating distances could be replaced with a fewer number of engines of a type offering a wider distribution of range and trajectory capabilities. Furthermore, many liquid-fueled engines would no longer be necessary and this would eliminate the costly construction of engines of this type as well as the time-consuming and expensive handling and storage problems associated with liquid-fueled engines, especially those which utilize highly corrosive and/or toxic propellants.

In accordance with the foregoing, it is an object of the present invention to provide a solid rocket propellant grain of unique structure.

Another object of the invention is to provide a solid rocket propellant grain which, when burned in a rocket engine, can deliver predetermined levels of impulse.

A still further object of the instant invention is to provide a method for operating a solid-fueled rocket engine whereby total impulses of varying predetermined magnitude can be accomplished.

An additional object of the invention is to provide a solid-fueled rocket motor capable of producing a varying total impulse.

The manner in which these and other objects can be accomplished will become apparent from the following detailed description wherein:

FIG. 1 is a view partially in section of one embodiment of a solid rocket motor and a propellant grain contemplated by the invention;

FIG. 2 is a sectional view of the propellant grain and the rocket motor taken along line 2—2 of FIG. 1; and FIG. 3 is a sectional view of another embodiment of a propellant grain contemplated by the present invention.

It will be apparent that the present invention is independent of the particular propellant composition utilized in fabricating the grains. The propellant composition will normally be a cured intimate mixture of a polymeric binder, fuel particles, and an oxidizer. As polymeric binders the polyurethanes, polydienes, polysulfides, polylactams, and the like are completely satisfactory. Moreover, double-base propellant compositions are completely satisfactory. If desired, the propellant grain can contain no fuel components other than the binder. However, high energy fuels can, and normally will, be incorporated in the composition. Illustrative of these high-energy fuels are powdered metal and metal hydrides as exemplified by aluminum, aluminum hydride, magnesium, lithium, lithium hydride, boron, and boron hydride and alloys of these metals. As an oxidizer, inorganic nitrates, chlorates, perchlorates, and the like such as ammonium perchlorates, ammonium nitrate, alkali and alkaline earth metal chlorates, perchlorates, and nitrates (e.g. sodium nitrate, potassium nitrate, potassium perchlorate) will normally be employed. Typical illustrative propellant formulations and the methods for preparing them are given in the following U.S. Pat. Nos. 2,962,368; 2,982,638; 2,995,430; 2,997,375; 2,997,376; 3,003,861; 3,036,939.

The liner which separates the layers of propellant composition can be any material which will not support its own combustion or readily disintegrate as a result of the heat and erosion caused by the burning of adjacent propellant layers. In addition to these characteristics, the liner material must be hypergolic with some fluid oxidizer such as fluorine, chlorine trifluoride, perhalogenyl fluoride, perhalogenyl fluoride-halogen fluoride mixtures, perhalogenyl fluoride-fluorine mixtures, perhalogenyl fluoride-chloryl fluoride mixtures, chlorine pentafluoride, red fuming nitric acid, and the like. This last requirement is not particularly limiting since almost any organic material is hypergolic with these oxidizers, especially red fuming nitric acid, chlorine trifluoride, and mixtures of perchloryl fluoride and at least one of the group chlorine trifluoride, fluorine, or chloryl fluoride. For this reason the liner materials will generally be a cured organic polymer.

The type of organic polymer is not critical and any of the polymeric materials used as binders and/or fuels in solid propellant compositions can be used as the liner material to separate the propellant layers. The polymeric hydrocarbons and their halogenated analogs are particularly well suited as liners. In this group would be the 1,4-addition polymers and copolymers of the conjugated dienes (polydienes) of up to eight carbon atoms and their halo substituted analogs as exemplified by polybutadiene, polychloroprene, polyisoprene, and copolymers of these conjugated dienes; polyethylene; polybutylene, polystyrene, and polypropylene. The polysulfides such as those sold by Thiokol Chemical Corporation as LP-2, LP-3, and LP-8 are useful as liners. The polyepoxides, polyurethanes, polylactams constitute another class of polymers well suited for use as liners.

From the foregoing, it is apparent that the function of the liner is to separate the propellant layers from each other so that combustion of one layer does not automatically lead to the combustion of the adjacent layer. Therefore, the liner should completely cover the common surfaces of adjacent propellant layers. By common surface is meant those surfaces which would be in contact if no liner was disposed between the layers.

The propellant grains of the present invention are substantially cylindrical and have an internal perforation running from end to end therethrough along the center axis. Ordinarily the grain will have from two to about eight concentric layers of propellant extending outward from the center of the grain, each layer of propellant being separated from adjacent layers by a coating of the liner material. Obviously, there is no limit on the number of propellant layers a grain may have although, in practical application, situations requiring more than eight layers would be rare. This is especially true since the thickness of the propellant layers themselves is also easily controlled, thus permitting additional control over the total impulse of the engine by varying the amounts of propellant in the different layers of propellant.

Any conventional shape can be used for the internal perforation in the grain including a tubular passage, a four-pointed star, a five-point star, and the like. The particular engine and propellant will determine the best perforation shape for any given application of the invention.

The thickness of each propellant layer can vary over a wide range, for example, up to 20 inches for ICBM's. However, layer thicknesses of about one inch to about 6 inches are most desirable since they are easier to manufacture. The liner material separating the propellant layers can be up to about 0.75 inch in thickness, but normally will be about 0.1 to about 0.25 inch in thickness since the thicker the liner, the more oxidizer required to burn the liner.

The propellant grains are fabricated according to conventional techniques. For example, a polysulfide propellant formulation of the type shown in U.S. Pat. No. 2,997,376 is prepared and poured into a mold having a mandrel positioned in the center thereof. After curing, the mandrel is removed. Upon removal from the mold, the outside surface of the grain is coated with a polymeric liner such as polybutadiene. The liner can be applied by dipping, spraying, painting, or other conventional techniques. After each application the liner is allowed to cure or at least to set. Additional liner material is applied until the desired thickness is obtained. The coated propellant grain thus formed is centered in a mold or motor casing and another layer of propellant formulation is poured around it between the liner and the inside surface of the mold or motor casing. The propellant formulation is then permitted to cure. In this manner a perforated grain consisting of two concentric layers of propellant separated by a cured polymer liner is produced. Obviously, the procedure can be repeated to produce a grain consisting of as many propellant layers as desired. Moreover, it should be pointed out that the procedure can be conducted starting with the outermost propellant layer. Using this technique, a propellant formulation would be poured in a rocket motor chamber or a mold with a large mandrel centered therein. After the formulation cured, the mandrel would be removed and a liner of the desired thickness applied to the inside surface of the grain. When the liner had cured, a smaller mandrel would be centered in the motor casing or mold and additional propellant formulation poured between the liner and the mandrel. This procedure also produces a perforated grain consisting of two concentric layers of propellant separated by a liner material. Again, the procedure can be repeated until the desired number of separated propellant layers have been fabricated.

Another method by which the propellant grains of the instant invention can be prepared is that of first producing the liners. This can be done by molding, extruding, or otherwise shaping thin-walled cylinders from the above-mentioned liner materials. These preformed liners are then placed in suitable molds or the motor cases themselves. Thereafter the propellant formulation is poured between the liner and the walls of the mold or motor case and allowed to cure. Then a second preformed liner of a smaller size than the first liner is centered inside the first liner and additional propellant formulation poured into the space between the first and second preformed liners. The process can be repeated until as many propellant layers as desired have been achieved. One advantage in this particular method of preparing the propellant grains of this invention is that as many preformed liners as necessary can be placed inside the motor casing or mold and then all the spaces between the various liner can be filled simultaneously with the desired propellant formulation. There is also a drawback to this procedure. The preformed liner may not have sufficient strength to support the weight of the uncured propellant without being distorted. In this case, it will normally be necessary to provide support for the preformed liner until the propellant sets or preferably until it cures. This can be done by inserting a support into the inner space of the liner while the propellant formulation cures. After curing the support is removed and the process can be repeated. It is obvious that the propellant grains can be fabricated with preformed liners either from the center position of the grain outward or from the outermost propellant layer inward towards the center of the grain.

The propellant layers and the liners separating them should adhere to each other strongly so that they are in rigid relationship to each other. In this manner, the propellant grain acts as a single unit. Achieving this rigid relationship is no problem since the propellant layers using polymeric binders and polymeric liner materials normally adhere to each other with great strength. In any situation where the particular liner and propellant do not exhibit a mutual adherence, a thin coating of an adhesive (an epoxy adhesive, for example) or some other material to which both the propellant layer and the liner will adhere is applied to either the propellant layer surface adjacent to the liner or the surface of the liner (or both) thus forming a rigid bond between the propellant layer and liner.

In the operation of a rocket engine using the above described propellant grains, the innermost layer of propellant is ignited in the conventional manner such as with igniter squibs. After the combustion of this innermost propellant layer is complete, a liquid oxidizer which is hypergolic with the liner material is injected or sprayed into the combustion chamber. Contact of the liner with the oxidizer results in ignition of the liner. Combustion of the liner is maintained by continuing the injection of oxidizer until the liner is consumed and the next layer of propellant has been ignited. The ignition of the next propellant layer will result from contact of the layer with the hypergolic oxidizer and/or from the combustion of the liner. However, separate ignition means to ignite each layer of propellant can be provided if desired. As many layers of propellant as desired can be ignited and burned by this method of operating a rocket engine thereby affording control over the total impulse produced by a given engine.

The possible schemes for contacting the fluid oxidizer and the liner material during operation of the engine are extensive. The simplest method is to continuously inject the oxidizer into the motor at all times during operation. Since the time to burn through a given number of liners and propellant layers in a given motor is easily determined according to known procedures, the total number of propellant layers to be burned can be controlled by ceasing the fluid oxidizer flow at a prearranged time by means of a time-responsive cut-off valve. After the oxidizer flow is halted, no additional liners will be burned through and, consequently, only the propellant layer burning at the time the oxidizer flow is stopped continues to burn.

Another means of controlling the oxidizer flow is by means of a pressure responsive valve. As is well known, the chamber pressure of a given solid-fueled rocket engine produces a relatively uniform pressure curve from ignition to burn-out. Therefore, the valve can be regulated so that it will close when the chamber pressure falls to a certain predetermined pressure and, thus, prevent the ignition and combustion of any additional liners. This in turn prevents combustion of additional propellant layers.

Still another means for regulating the liquid oxidizer flow is to use a pressure-responsive valve which would open and admit the oxidizer when the chamber pressure began to suddenly drop as a result of the burn-out of one layer of propellant. The oxidizer would flow into the chamber igniting the liner and then the next propellant layer. This would increase the chamber pressure and the valve would close, stopping the flow of oxidizer. The valve mechanism would be such that it would only open and shut a predetermined number of times so that only the desired number of propellant layers would be burned.

The valve controlling oxidizer flow could also be actuated by means of an accelerometer. Thus when a propellant layer burned out acceleration would stop. At this point, the accelerometer would cause the valve to open and thereby ignite the next propellant layer. A timing device would prevent further operation of the valve after a preset time interval had lapsed.

The particular means for controlling the oxidizer flow is not critical to the invention since many satisfactory art-recognized expedients are known for regulating fluid flow. The selection of any given device for use with a given motor is within the skill of the art. The only essential feature is that some means be provided to admit the oxidizer into the chamber and to halt the oxidizer flow when the desired number of propellant layers have been burned. The means of getting the oxidizer into the combustion chamber can be any of the conventional methods now used in the operation of liquid-fueled engines. Pumps and compresses gases are examples of suitable means for forcing the oxidizer into the combustion chamber.

One embodiment of the present invention is illustrated in FIG. 1 and FIG. 2. In FIG. 2 a propellant grain 10 of a type envisioned by the present invention is shown disposed within the wall 12 of the motor 30. The grain is made of three layers of propellant designated as 14, 16, and 18. The propellant layers are separated from each other by liners 20 and 22. Four-point star perforation 24 is disposed along the center axis of the grain and runs from end to end therethrough. FIG. 1 shows propellant grain 10 rigidly disposed in chamber 15 of motor 30. This chamber is formed by the substantially cylindrical wall 12 of motor 30. The wall tapers at the rear end of the chamber to form converging-diverging nozzle 70. The forward end 72 of the chamber is closed except for opening 74. Opening 74 is in communication with perforation 24 which receives tube 48. A tank 40 is provided for storing the liquid oxidizer. The oxidizer is transported from the tank to the forward portion 46 of perforation 24 through tube 48 which is provided with nozzle 44. Oxidizer flow through tube 48 is regulated by valve 42.

In the operation of motor 30 according to one aspect of the present invention, propellant layer 18 is ignited and burned. Then a fluid oxidizer which is hypergolic with liner 20 is introduced into the motor chamber through nozzle 44. The oxidizer ignites liner 20 which burns through and thereby ignites propellant layer 16. This process is repeated until as many layers of propellant as required have been burned to provide the necessary thrust for a specific task. The flow of hypergolic oxidizer can be continuous and terminated only after the desired number of propellant liners have been ignited.

FIG. 3 is a sectional view of another propellant grain configuration embodying the aspects of the present invention. The cylindrical grain 50 is shown disposed in rocket motor chamber 52 formed by the cylindrical wall 82. Each of the propellant layers 54, 58 and 64 are separated from each other by liners 56 and 62. Cylindrical perforation 60 is disposed in the center of grain 50 and extends from end to end therethrough. Operation of a rocket motor with a grain of this type would be substantially identical to the operation of motor 30 which is discussed hereinabove.

As previously mentioned, the possible combinations of solid propellant, liner, and oxidizer are extensive. For example, the layers of propellant can be of the polysulfide-perchlorate type shown in U.S. Pat. No. 2,997,376. The liner material can be polybutadiene and the liquid oxidizer a perchloryl fluoride-chlorine trifluoride solution containing about 25 percent to about 50 percent by weight perchloryl fluoride. Polystyrene can also serve as the liner and fluorine as the oxidizer. These are but two specific examples of satisfactory combinations and are by no means limiting. Those skilled in the art are aware of the many organic polymers (practically all) which are hypergolic with the oxidizers mentioned hereinabove and will experience no difficulty in finding numerous satisfactory combinations of polymeric liners and hypergolic oxidizers within the framework and guidance of this disclosure.

No undue limitations should be attributed to the instant invention as a result of the above detailed description thereof except as reflected in the appended claims.

We claim:

1. A solid-fueled rocket propellant grain, said grain comprising in combination:
   a. a plurality of concentric layers of propellant, the propellant layer nearest the center of the grain having disposed therein a perforation passing from end to end therethrough along the center axis of said grain, said propellant layers consisting essentially of a cured, intimate mixture of a polymeric binder, fuel particles, and an oxidizer therefor; and
   b. a liner disposed between each of said layers in rigid relationship therewith to completely separate the adjacent surfaces of said layers from each other, said liner consisting essentially of a cured polymeric material incapable of supporting its own combustion.

2. The solid rocket propellant grain according to claim 1 wherein said liner is up to about 0.75 inch in thickness.

3. A solid rocket propellant grain according to claim 2 wherein said liner is a member selected from the group consisting of the polydienes, the polysulfides, the polyepoxides, polyurethanes, polylactams, polystyrenes, polyethylenes, polypropylenes, and polybutylenes.

4. A solid-fueled rocket motor, said motor comprising in combination:
   a. a substantially cylindrical outside wall which forms a chamber, said wall being tapered at the rearward end of said chamber to form a converging-diverging nozzle, said wall also closing the forward end of chamber except for an opening in communication with said chamber to receive a tube whereby fluid can be introduced into said chamber; and
   b. a solid rocket propellant grain rigidly disposed in said chamber, said grain comprising a plurality of concentric layers of propellant, the propellant layer nearest the center of the grain having disposed therein a perforation passing from end to end therethrough along the center axis of said grain, said propellant layers consisting essentially of a cured intimate mixture of a polymeric binder, fuel particles, and an oxidizer therefor, said layers being completely separated from each other by a liner, said liner consisting essentially of a cured polymeric material incapable of supporting its own combustion.

5. The solid-fueled rocket motor according to claim 4 wherein said liner is up to about 0.75 inch in thickness.

6. The solid-fueled rocket motor according to claim 5 wherein said liner is a member selected from the group consisting of the polydienes, the polysulfides, the polyepoxides, polyurethanes, polylactams, polystyrenes, polyethylenes, polypropylenes, and polybutylenes.

7. The method of operating a solid-fueled rocket motor to vary the total impulse achieved, said motor comprising, in combination, a substantially cylindrical outside wall which forms a chamber, said wall being tapered at the rearward end of said chamber to form a converging-diverging nozzle, said wall also closing the forward end of said chamber except for an opening to receive a tube whereby fluid can be introduced into said chamber; a solid rocket propellant grain rigidly disposed in said chamber, said grain comprising a plurality of concentric layers of propellant, the propellant layer nearest the center of the grain having disposed therein a perforation passing from end to end therethrough along the center axis of said grain, said layers consisting essentially of a cured intimate mixture of polymeric binder, fuel particles, and an oxidizer therefor, said layers being completely separated from each other by a liner, said liner consisting essentially of a cured polymeric material incapable of supporting its own combustion, said method comprising:

a. igniting and burning the innermost layer of propellant, thereby exposing the adjacent liner;

b. introducing into the forward end of said chamber through said opening an oxidizer fluid which is hypergolic with said liner whereby the liner ignites, burns, and in turn ignites the adjacent layer of propellant; and c. repeating steps (a) and (b) until as many propellant layers as desired have been consumed.

8. The method according to claim 7 wherein said liner is up to about 0.75 inch in thickness.

9. The method according to claim 8 wherein said liner is a member selected from the group consisting of the polydienes, the polysulfides, the polyepoxides, polyurethanes, polylactams, polystyrenes, polyethylenes, polypropylenes, and polybutylenes.

10. The method according to claim 9 wherein said fluid oxidizer is a member selected from the group consisting of red fuming nitric acid, fluorine, chlorine trifluoride, perhalogenyl fluoride-halogen fluoride mixtures, perhalogenyl fluoride-fluorine mixtures, and perhalogenyl fluoride-chloryl fluoride mixtures.

* * * * *